(12) United States Patent
Kawai et al.

(10) Patent No.: US 8,153,896 B2
(45) Date of Patent: Apr. 10, 2012

(54) ELECTRICAL-WIRE SUPPORT APPARATUS

(75) Inventors: Atsushi Kawai, Yamato (JP); Yoshikazu Ito, Yamato (JP)

(73) Assignee: Molex Incorporated, Lisle, IL (US)

( * ) Notice: Subject to any disclaimer, the term of this patent is extended or adjusted under 35 U.S.C. 154(b) by 776 days.

(21) Appl. No.: 12/083,959

(22) PCT Filed: Oct. 26, 2006

(86) PCT No.: PCT/US2006/041589
§ 371 (c)(1), (2), (4) Date: Dec. 22, 2008

(87) PCT Pub. No.: WO2007/050666
PCT Pub. Date: May 3, 2007

(65) Prior Publication Data
US 2009/0101405 A1      Apr. 23, 2009

(30) Foreign Application Priority Data

Oct. 26, 2005   (JP) .................................. 2005-310616

(51) Int. Cl.
*H02G 3/00* (2006.01)
*H01B 7/00* (2006.01)
(52) U.S. Cl. ..................... 174/70 R; 174/135; 174/68.1; 174/72 A; 455/575.1
(58) Field of Classification Search ............... 174/70 R, 174/135, 68.1, 68.3, 72 A, 71 R, 72 TR, 73.1, 174/99 R; 361/610, 671, 679.12, 679.28, 361/719, 720, 748, 755, 818; 455/575.1, 455/575.3, 553.1, 550.1
See application file for complete search history.

(56) References Cited

U.S. PATENT DOCUMENTS

| 5,335,142 | A | 8/1994 | Anderson |
| 6,549,789 | B1 * | 4/2003 | Kfoury ........................ 455/575.3 |
| 7,158,083 | B2 * | 1/2007 | Satoh et al. ................. 455/550.1 |

(Continued)

FOREIGN PATENT DOCUMENTS

| JP | H02-076662 | 12/1991 |
| JP | H08-096682 | 10/1997 |
| JP | H09-075558 | 10/1998 |
| JP | 2000-067136 | 9/2001 |

(Continued)

OTHER PUBLICATIONS

International Search Report for PCT/US06/041589.

*Primary Examiner* — Angel R Estrada
(74) *Attorney, Agent, or Firm* — Timothy M. Morella (57) ABSTRACT

An electrical-wire support structure (30) is disposed at a rotary connection portion of a device and connects first and second portions (11, 12) of the device. The second portion being rotatable about at least two rotational axes. The electrical-wire support structure includes frame members having a through-hole (36, 43) through which an electrical wire (51) may pass, and the through-hole (36, 43) is positioned on one of the rotational axes. An electrical wire (51) has first and second opposite ends. The first end is configured to be disposed on the first portion (11) and the second end is configured to be disposed on the second portion (12). The electrical wire is supported by such electrical-wire support structure such that the wire passes through the through-hole and at least one first bent portion (53) of approximately 180 degrees is formed on the electrical wire (51), and at least one second bent portion (54) of approximately 90 degrees is formed on the electrical wire (51) between the first bent portion (53) and each of the first and second opposite ends of the electrical wire (51).

15 Claims, 9 Drawing Sheets

U.S. PATENT DOCUMENTS

| | | | |
|---|---|---|---|
| 7,448,891 B2 * | 11/2008 | Ahn | 361/755 |
| 7,454,229 B2 * | 11/2008 | Ikeda | 455/553.1 |
| 7,682,170 B2 * | 3/2010 | Hori et al. | 361/679.28 |
| 2004/0067783 A1 * | 4/2004 | Lenchik et al. | 455/575.1 |
| 2005/0091431 A1 | 4/2005 | Olodort et al. | |

FOREIGN PATENT DOCUMENTS

| | | |
|---|---|---|
| JP | 2001-300774 | 4/2003 |
| JP | 2004-002734 | 7/2005 |
| JP | 2004-024297 | 8/2005 |
| WO | WO 01/84729 | 11/2001 |

* cited by examiner

ELECTRICAL-WIRE SUPPORT APPARATUS

BACKGROUND OF THE INVENTION

1. Field of the Invention

The present invention relates to an electrical-wire support apparatus.

2. Description of the Related Art

Conventionally, in electronic devices, such as personal computers, cellular phones, personal digital assistants (PDAs), digital cameras, video cameras, music players, game machines, and vehicle navigation devices, a casing is designed to be foldable so as to reduce the overall size of the casing and simultaneously increase the size of a display (see, for example, Japanese Patent Application Laid-Open (kokai) No. 2003-258961).

Figure 9:
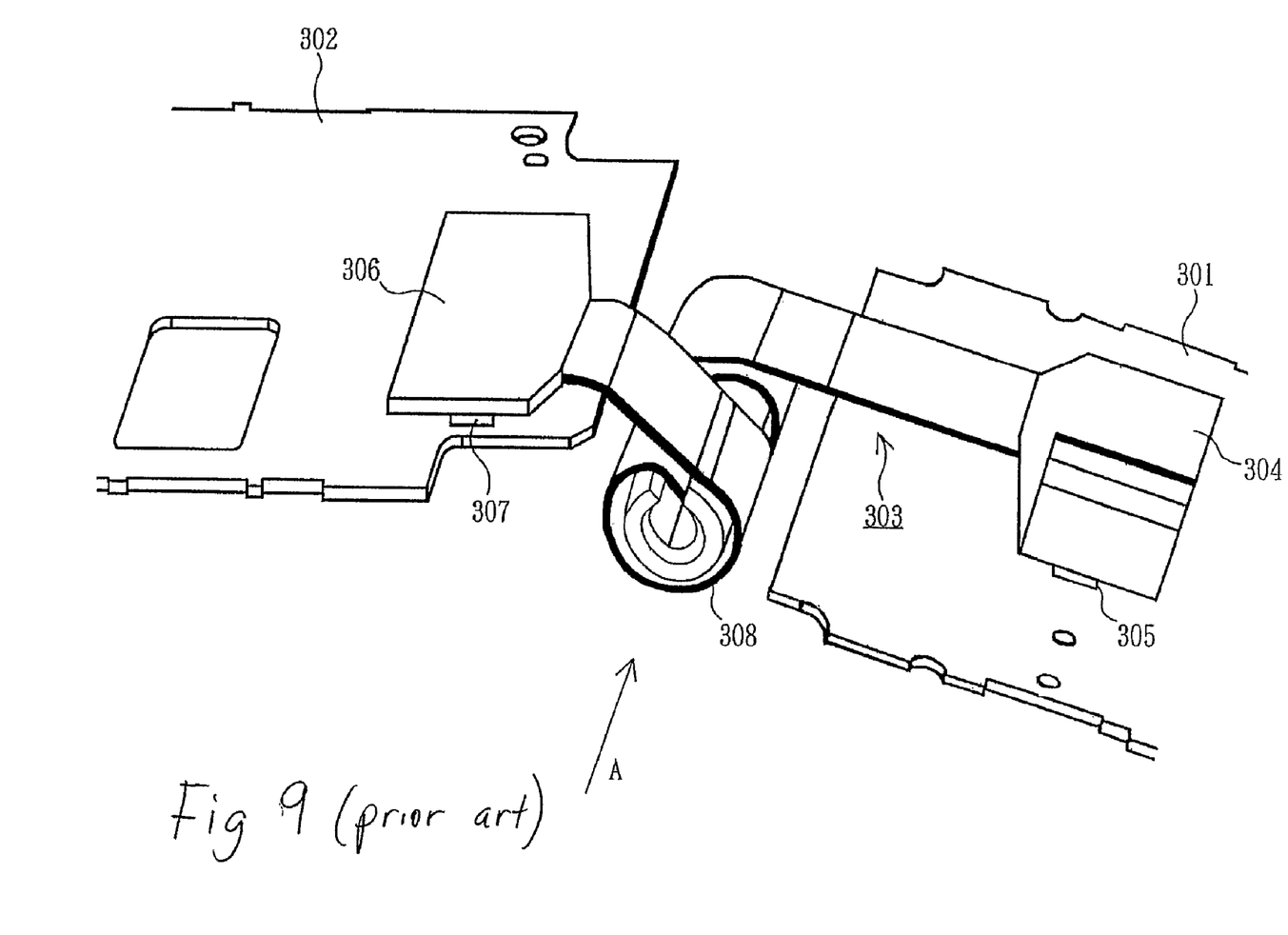
FIG. 9 is a view showing wiring for connecting boards in a conventional foldable electronic device.

FIG. 9 is a view showing wiring for connecting boards in a conventional foldable electronic device.

In FIG. 9, a first circuit board 301 is mounted on a first casing of a cellular mobile telephone, which is an example foldable electronic device. A second circuit board 302 is mounted on a second casing rotatably attached to the first casing.

A flexible wiring board or flexible printed circuit 303 serves as an electrical wire for connecting the first circuit board 301 and the second circuit board 302. A first wiring connector 304 attached to one end of the flexible wiring board 303 is connected to a first board mount connector 305 mounted on the first circuit board 301. A second wiring connector 306 attached to the other end of the flexible wiring board 303 is connected to a second board mount connector 307 mounted on the second circuit board 302.

An intermediate portion of the flexible wiring board 303 is wound around a cylindrical fixation tube 308 having a longitudinal slit, and is supported thereby. The fixation tube 308, which serves as an electrical-wire support apparatus, is disposed within a hinge portion that provides rotatable connection between the first and second casings. This configuration enables the first casing to be rotated in relation to the second casing about an axis shown by arrow A. Therefore, even when the first casing is rotated in relation to the second casing as a result of an operation of opening a display portion of the cellular phone in the folded state so as to make a call, the flexible wiring board 303, which serves as electrical wires, can smoothly deform, so that the first and second circuit boards 301 and 302 can maintain electrical connection therebetween.

However, the above-described conventional electrical wire support apparatus can cope with only rotations motion about a single axis, and cannot cope with rotational motions about two axes. Therefore, the conventional electrical-wire support apparatus cannot cope with a complex connection between two or more casings. Recently, electronic devices, such as cellular phones, are designed such that, in order to improve the visibility of a display, one casing supporting the display can be rotated about an axis to open in relation to the other casing, and can be further rotated about another axis. By virtue of this structure, a user of the electronic device can freely change the orientation of the display. The electrical-wire support apparatus shown in FIG. 9 cannot cope with such rotation about two axes. Specifically, even in the case where a hinge portion which enables rotation about an axis perpendicular to the axis indicated by arrow A is employed, if the display is rotated about the axis perpendicular to the axis indicated by arrow A, the flexible wiring board 303 is twisted, which makes the rotation about two axes difficult. Use of a cable composed of a plurality of electrical wires in place of the flexible wiring board 303 enables rotation about two axes, because the cable allows some degree of twist. However, in this case, if the cable is twisted, force acts on neck portions of the cable; i.e., opposite end portions of the cable connected to the wiring connectors, whereby the wires of the cable may be broken, or signals transmitted therethrough may suffer disturbance.

SUMMARY OF THE INVENTION

An object of the present invention is to solve the above-mentioned problems of conventional electrical-wire support apparatuses and to provide an electrical-wire support apparatus which prevents a twist of an electrical wire from being transmitted to the opposite ends of the wire and thereby prevent application of force to connection portions between the electrical wire and connectors. Briefly, in the electrical-wire support apparatus of the present invention, an electrical wire is disposed to pass through through-holes formed in a hinge support structure which enables rotation about at least two axes. At least one of the through-holes is present on a rotational axis. At least one lSD-degree bent portion is formed on the electrical wire and at least one gO-degree bent portion is formed on the electrical wire between the lSD-degree bent portion and each of opposite ends of the electrical wire.

In order to achieve the above object, the present invention provides an electrical-wire support structure disposed at a rotary connection portion which connects a first portion of a device and a second portion of the device connected to the first portion to be rotatable about at least two rotation axes. The electrical-wire support structure supports an electrical wire having opposite ends disposed on the first portion and the second portion, respectively. The electrical-wire support structure further includes through-holes through which the electrical wire passes, and at least one of the through-holes is present on one of the rotation axes. The electrical wire is supported such that at least one bent portion of approximately lSO degrees is formed on the electrical wire, and at least one bent portion of approximately 90 degrees is formed on the electrical wire between the bent portion of approximately 180 degrees and each of the opposite ends of the electrical wire.

Preferably, the electrical-wire support structure further includes a first support member attached to the first portion, a second support member attached to the first support member via a coupling portion rotatable about a first rotational axis, and a third support member attached to the second support member via a coupling portion rotatable about a second rotational axis. The third support member may be attached to the second portion. The through-holes through which the electrical wire passes may be formed in the coupling portion that is rotatable about the first rotational axis and/or the coupling portion rotatable about the second rotational axis.

If desired, the through-holes through which the electrical wire passes may be formed in portions of the first support member, the second support member and/or the third support member other than the coupling portion rotatable about the first rotational axis and the coupling portion rotatable about the second rotational axis. The first and second rotation axes may be perpendicular to each other.

The present invention provides another electrical-wire support structure disposed at a rotary connection portion which connects a first portion of a device and a second portion of the device connected to the first portion to be rotatable about at least two rotation axes. The electrical wire support structure supports an electrical wire having opposite ends disposed on the first portion and the second portion, respectively. The electrical-wire support structure includes a first support member attached to the first portion, a second support member attached to the first support member via a coupling portion rotatable about a first rotational axis, and a third support member attached to the second support member via a coupling portion rotatable about a second rotational axis. Through-holes are formed in the coupling portion that is rotatable about the first rotational axis and the coupling portion that is rotatable about the second rotational axis. The electrical wire is supported such that the electrical wire passes through the through-holes formed in the coupling portion rotatable about the first rotational axis and/or the coupling portion rotatable about the second rotational axis. In addition, at least one bent portion of approximately 180 degrees is formed on the electrical wire, and at least one bent portion of approximately 90 degrees is formed on the electrical wire between the bent portion of approximately 180 degrees and each of the opposite ends of the electrical wire.

In the electrical-wire support apparatus of the present invention, an electrical wire is disposed to pass through through-holes formed in a hinge support structure which enables rotation about at least two axes. At least one of the through-holes is present on a rotation axis and at least one IBO-degree bent portion is formed on the electrical wire and at least one 90-degree bent portion is formed on the electrical wire between the lBO-degree bent portion and each of opposite ends of the electrical wire. Accordingly, the electrical-wire support apparatus of the present invention can prevent a twist of an electrical wire from being transmitted to the opposite ends of the wire and thereby prevent application of force to connection portions between the electrical wire and connectors.

Other objects, features and advantages of the present invention will Be apparent from the following detailed description taken in conjunction with the accompanying drawings.

BRIEF DESCRIPTION OF THE DRAWINGS

The invention will now be described by way of example with reference to the following figures in which like reference numerals designate the same element.

DETAILED DESCRIPTION OF PREFERRED EMBODIMENT

An embodiment of the present invention will next be described in detail with reference to the drawings.

Figure 1:
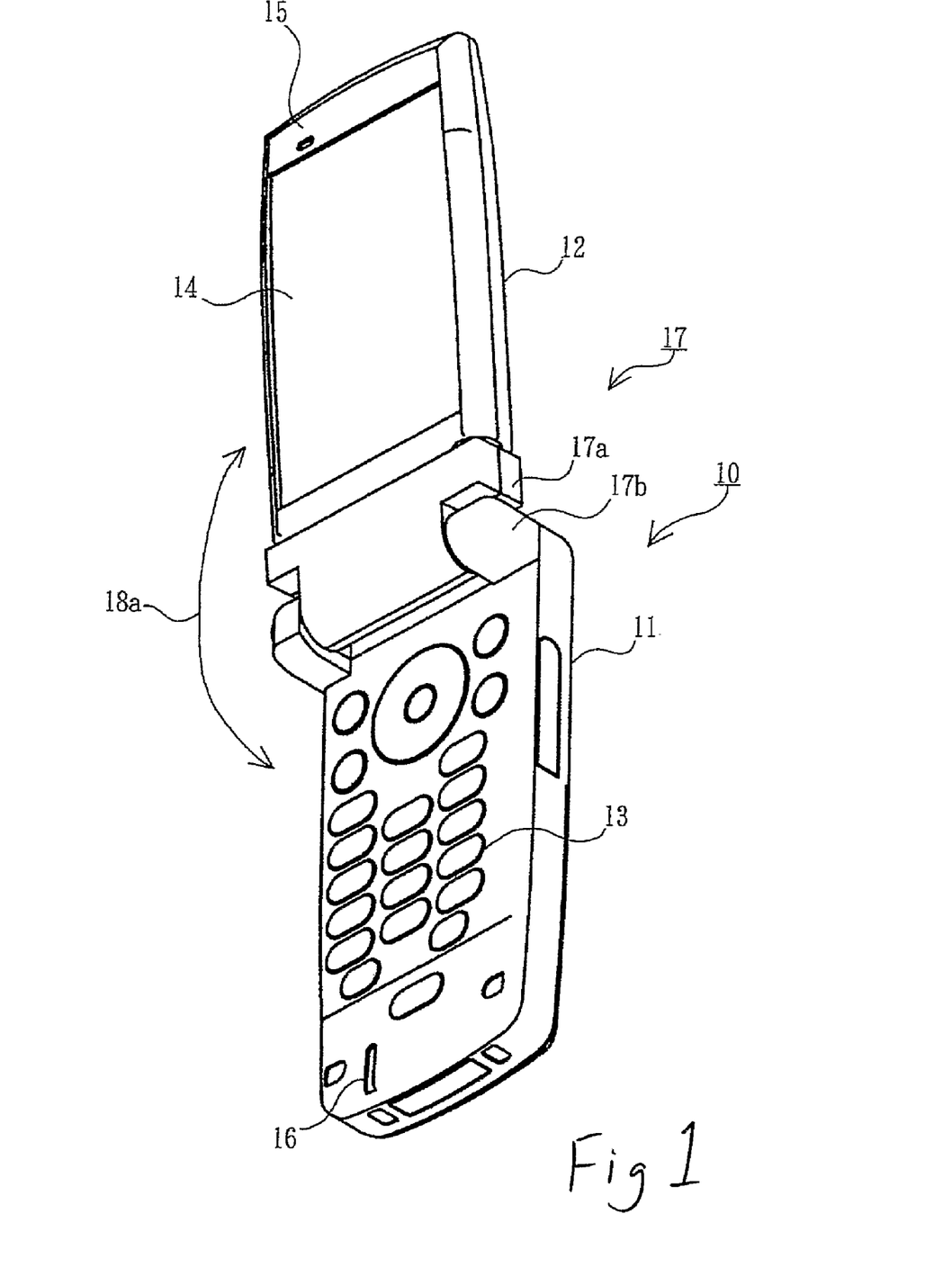
FIG. 1 is a first perspective view of a device in which an electrical-wire support apparatus according to an embodiment of the present invention is used.
Figure 2:
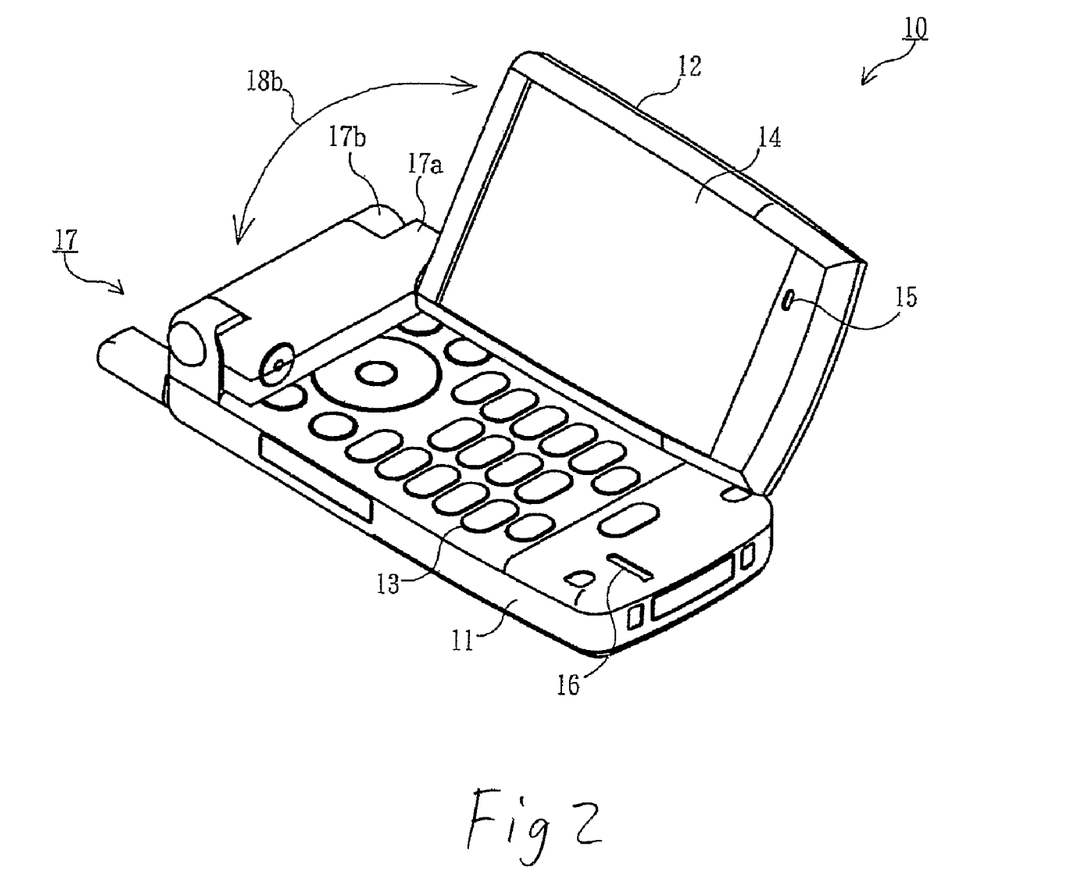
FIG. 2 is a second perspective view of the device of FIG. 1.

FIG. 1 is a first perspective view of a device in which an electrical-wire support apparatus according to the embodiment of the present invention is used; and FIG. 2 is a second perspective view of the device of FIG. 1.

In FIG. 1, reference 10 denotes a cellular phone (device) according to the present embodiment, in which a hinge support structure 30 to be described later is disposed. The device may be of a different type, such as a personal computer, a PDA, a digital camera, a video camera, a music player, a game machine, or a vehicle navigation device, so long as the casing is divided into at least two portions which are rotatably connected together. However, in the present embodiment, descriptions will be given under the assumption that the device is the above-mentioned cellular phone 10.

In the description of the present embodiment, terms for expressing direction, such as up, down, left, right, front, and rear, are for explaining the structure and action of portions of the cellular ~hone 10 and the hinge support structure 30. However, these terms represent respective directions for the case where the cellular phone 10 and the hinge support structure 30 are used in orientations shown in the drawings, and must be construed to represent corresponding different directions when the orientations of the cellular phone 10 and the hinge support structure 30 are changed.

The cellular phone 10 includes an operation portion casing (first portion) 11 and a display portion casing (second portion) 12, which is rotatably connected to the operation portion casing 11 via a hinge portion 17. The hinge portion 17 includes an intermediate portion 17a present between the operation portion casing 11 and the display portion casing 12, and two support arm portions 17b projecting from the operation portion casing 11. The operation portion casing 11 includes a plurality of operation elements 13 formed of push buttons or the like. The display portion casing 12 includes a display portion 14 formed of a liquid crystal display, an LED display, or the like and adapted to display characters and images. The display portion casing 12 also includes a sound output portion 15 formed of a speaker or the like and disposed in the vicinity of the upper end in FIG. 1. The operation portion casing 11 also includes a sound input portion 16 formed of a microphone or the like and disposed in the vicinity of the lower end in FIG. 1.

In FIG. I, the cellular phone 10 is shown in a state in which the display portion casing 12 is opened so as to make a call, send and receive e-mail, etc. A user can open and close the display portion casing 12 in relation to the operation portion casing 11 by rotating it about the hinge portion 17 as indicated by an arrow 18a; specifically, by rotating the intermediate portion 17a in relation to the support arm portions 17b as indicated by the arrow 18a.

Further, the user may open the display portion casing 12 of the cellular phone 10 as shown in FIG. 2 so as to display a photographed image, a broadcast television program, or the like. In this case, the user can open and close the display portion casing 12 in relation to the operation portion casing 11 by rotating it about the hinge portion 17 as indicated by an arrow 18b; specifically, by rotating the display portion casing 12 in relation to the intermediate portion 17a as indicated by the arrow 18b. That is, the hinge portion 17 enables rotation about two rotation axes to thereby cope with rotational motions of the display portion casing 12 in relation to the operation portion casing 11 about two rotation axes. Thus, the visibility of the display portion 14 can be improved.

Figure 3:
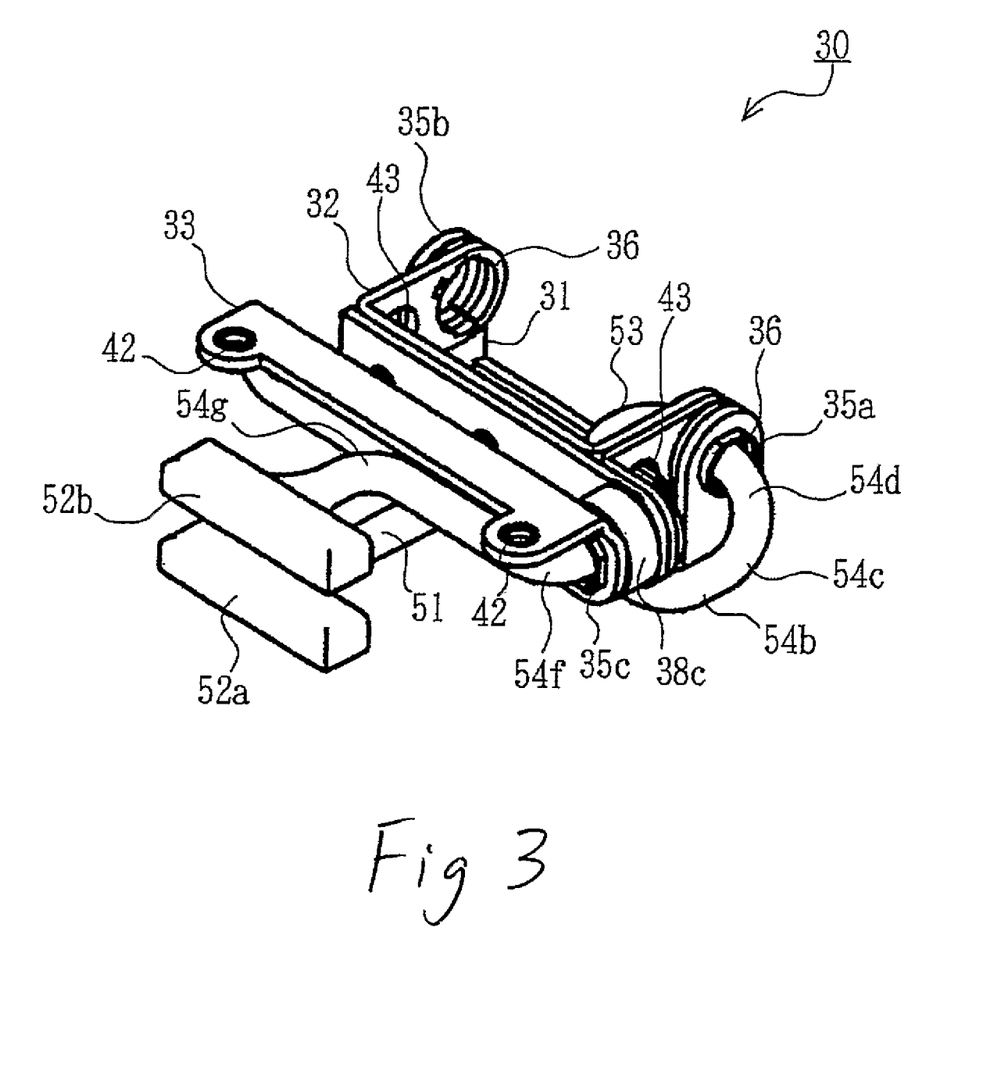
FIG. 3 is a perspective view showing a first position of the electrical-wire support apparatus according to the embodiment of the present invention.
Figure 4A:
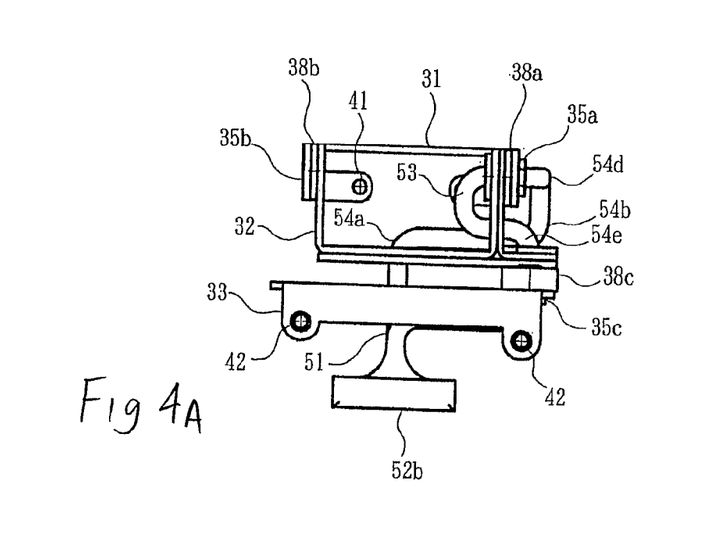
FIGS. 4A to 4C are top, front, and side views of the electrical-wire support apparatus in the first position.
Figure 4B:
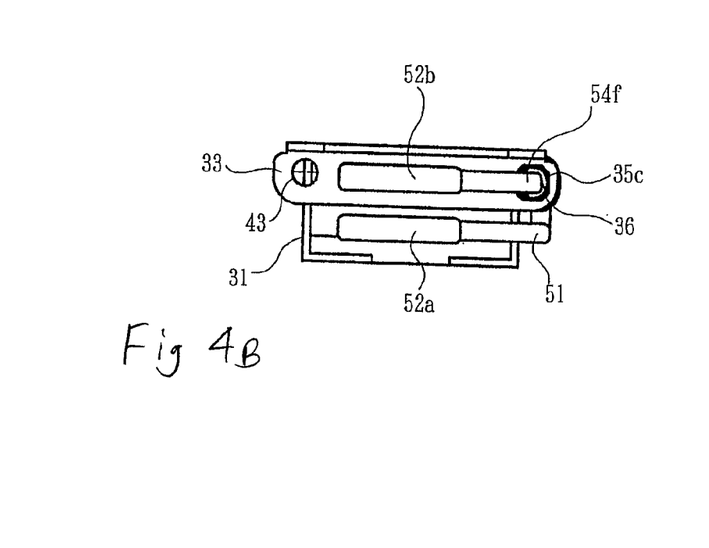
Figure 4C:
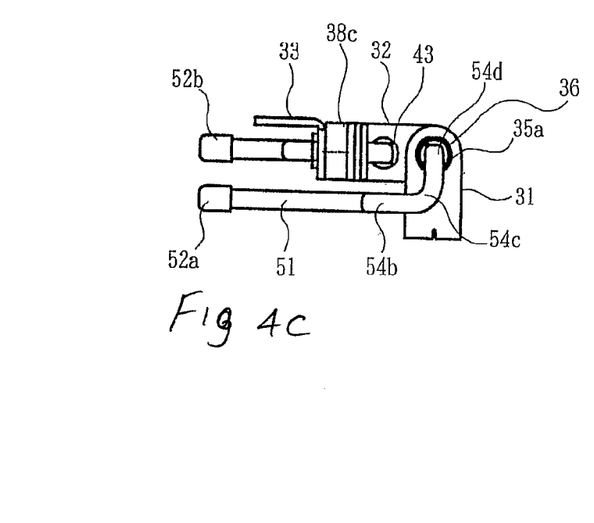
Figure 5:
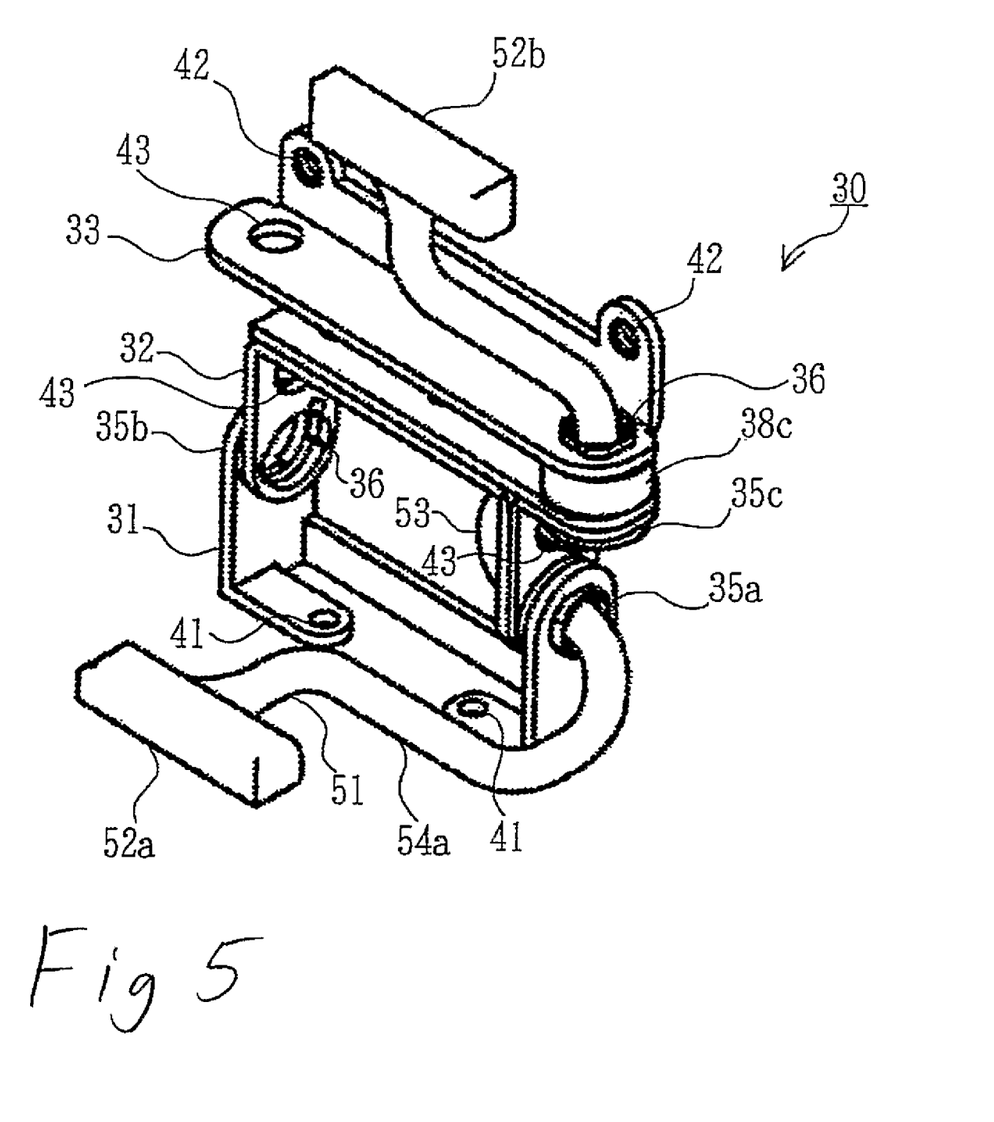
FIG. 5 is a perspective view showing a second position of the electrical-wire support apparatus according to the embodiment of the present invention.

FIG. 3 is a perspective view showing a first position of the electrical-wire support apparatus according to the embodiment of the present invention. FIGS. 4A to 4C are top, front, and side views of the electrical-wire support apparatus in the first position.

Referring to FIG. 3, the hinge support structure 30 is disposed inside the hinge portion 17, and also functions as an electrical-wire support apparatus for supporting a cable (electric wire or flexible printed circuit) 51 running through the hinge portion 17. As depicted, the cable 51 is composed of a plurality (e.g., 30) insulated electrical wires. However, the cable 51 may be composed of a single cable having many conductors. In the Instance where the cable 51 is composed of a plurality of electrical wires, the plurality of electrical wires may be bound, or not bound and remain loose. In order to facilitate the description, the cable 51 is assumed to be composed of a plurality of bound electrical wires which are covered with an insulating covering material over the entire length thereof and which can be handled as a single thick cable.

The cable 51 electrically connects a wiring board, etc. disposed inside the operation portion casing 11 and a wiring board, etc. disposed inside the display portion casing 12. A first connector 52a is connected to an end portion of the cable 51 located on the side toward the operation portion casing. A second connector 52b is connected to an end portion of the cable 51 located on the side toward the display portion casing 12. When the first and second connectors 52a and 52b are collectively described, they are referred to as the "connectors 52." The insulating cover member is removed from the opposite ends of the cable 51 so as to enable connection of the electrical wires to unillustrated terminals of the connectors 52. In the drawings, the portions of the cable 51 having the insulating cover member removed are depicted as being wider than the remaining portion.

In the illustrated example, the hinge support structure 30 includes a first support member 31 attached to the operation portion casing 11, a second support member 32 attached to the first support member 31 to be rotatable about a first rotation axis, and a third support member 33 attached to the second support member 32 to be rotatable about a second rotation axis. The third support member 33 is attached to the display portion casing 12. The hinge support structure 30 may have any structure and be composed of any number of members, insofar as it enables rotation about at least two axes.

In the illustrated example, the first support member 31 is composed of a single metal plate formed through stamping and bending, the second support member 32 is composed of three metal plates formed through stamping and bending, and the third support member 33 is composed of a single metal plate formed through stamping and bending. If desired, each of the first through third support members 31, 32, and 33 may be formed of a single component or a plurality of components, which may be made from a material other metal, such as ceramic, resin, or the like.

The first support member 31 has a bottom wall portion extending parallel to the first rotation axis, and two shaft support wall portions projecting perpendicularly from the opposite ends of the bottom wall portion. The second support member 32 has a bottom wall portion extending parallel to the first rotation axis, and two shaft-support wall portions projecting perpendicularly from the opposite ends of the bottom wall portion. The two shaft-support wall portions of the first support member 31 and the two shaft-support wall portions of the second support member 32 are rotatably coupled with each other at their distal end portions by means of first and second pivot coupling portions 35a and 35b.

The first and second pivot coupling portions 35a and 35b function as a rotatable coupling portion which is present on the first rotation axis and which enables rotational motion about the first rotation axis. With this structure, the first support member 31 and the second support member 32 are attached to each other to be rotatable about the first rotation axis. Through-holes 36 are formed in the first and second pivot coupling portions 35a and 35b such that they pass through the corresponding shaft-support wall portions of the first support member 31 and the second support member 32. The cable 51 is disposed to pass through the through-hole 36 of the first pivot coupling portion 35a.

Moreover, cylindrical first and second spacer members 38a and 38b formed of a synthetic resin are disposed at the first and second pivot coupling portions 35a and 35b such that they are interposed between the corresponding shaft support wall portions of the first support member 31 and the second support member 32. The thicknesses (i.e., the dimension as measured along the first rotation axis) of the first and second spacer members 38a and 3Bb can be set freely. If necessary, the first and second spacer members 38a and 38b may be omitted.

One end of the bottom wall portion of the second support member 32 ends at the shaft-support wall portion having the second pivot coupling portion 35b. However, the other end of the bottom wall portion extends outward beyond the shaft-support wall portion having the first pivot coupling portion 35a, and is rotatably coupled with the third support member 33 by means of a third pivot coupling portion 35c. The third support member 33 has a bottom wall portion extending perpendicular to the second rotation axis, and a shaft-support wall portion projecting perpendicularly from one longitudinal side edge of the bottom wall portion and extending along the same direction as does the bottom wall portion. The bottom wall portion of the second support member 32 and the shaft-support wall portion of the third support member 33 are rotatably coupled with each other at their end portions by means of the third pivot coupling portion 35c.

The third pivot coupling portion 35c functions as a rotatable coupling portion which is present on the second rotation axis extending perpendicularly to the first rotation axis and which enables rotational motion about the second rotation axis. With this structure, the second support member 32 and the third support member 33 are attached to each other to be rotatable about the second rotation axis. A through-hole 36 is formed in the third pivot coupling portion 35c such that it passes through the shaft-support wall portion. The cable 51 is disposed to pass through the through-hole 36 of the third pivot coupling portion 35c.

Moreover, a cylindrical third spacer member 38c formed of a synthetic resin is disposed at the third pivot coupling portion 35c to be interposed between the bottom wall portion of the second support member 32 and the shaft-support wall portion of the third support member 33. The thickness of the third spacer member 38c is greater than those of the first and second spacer members 38a and 38b; however, the thickness of the third spacer member 38c can be changed freely. If necessary, the third spacer member 38c may be omitted.

Moreover, the position of the third pivot coupling portion 35c may be changed freely. In the illustrated example, the third pivot coupling portion 35c is located on the outer side of the right-hand shaft-support wall of the second support member 32 in FIG. 4A. However, the third pivot coupling portion 35c may be located on the outer side of the left-hand shaft-support wall of the second support member 32 or located between the left-hand and right-hand shaft-support walls of the second support member 32.

In FIG. 3 and FIGS. 4A to 4C, the hinge support structure 30 is in a first position corresponding to a state in which the display portion casing 12 is closed in relation to the operation portion casing 11. Two attachment holes 41 are formed in the bottom wall portion of the first support member 31. The bottom wall portion is disposed in the operation portion casing 11 and attached thereto by means of unillustrated attachment members, such as screws or bolts, inserted through the attachment holes 41. Notably, the number and positions of the attachment holes 41 may be changed freely.

The bottom wall portion of the first support member 31 shown in FIGS. 4A to 4C is divided into left-hand and right-hand portions.

However, the bottom wall portion may be a continuous bottom wall which connects the left-hand and right-hand shaft-support wall portions of the first support member 31. The left-hand and right-hand shaft support wall portions of the first support member 31 are accommodated within the left-hand and right-hand support arm portions 17b of the hinge portion 17. Meanwhile, two attachment holes 42 are formed in the bottom wall portion of the third support member 33. The bottom wall portion is disposed in the display portion casing 12 and attached thereto by means of unillustrated attachment members, such as screws or bolts, inserted through the attachment holes 42. Notably, the number and positions of the attachment holes 42 may be changed freely. The bottom wall portion of the third support member 33 shown in FIG. 3 and FIGS. 4A to 4C is a continuous bottom wall. However, the bottom wall portion may be divided into left-hand and right-hand portions.

The second support member 32 is disposed in the intermediate portion 17a of the hinge portion 17 and is attached thereto. An electrical-wire support hole (through hole) 43 is formed in each of the left-hand and right-hand shaft-support wall portions of the second support member 32. The cable 51 is disposed to pass through the electrical-wire support hole 43 of the shaft-support wall portion near the third pivot coupling portion 35c.

In the illustrated example, the cable 51 is disposed to bend at a plurality of locations such that the cable 51 has a U-shaped portion (a bent portion of about 180 degrees) 53 and L-shaped portions (bent portions of about 90 degrees) 54a to 54g. The portion 53 is not necessarily required to assume a V-like shape and may assume a different shape such as a squarish-C-like shape, so long as the portion bends by approximately 180 degrees as a whole. Each of the portions 54a to 54g is not necessarily required to assume an L-like shape and may assume a different shape such as an arcuate shape, so long as the portions bend by approximately 90 degrees. Notably, when the L-shaped portions 54a to 54g are collectively described, they will be referred to as the "L shaped portions 54."

The minimum requirement for the cable 51 of the present embodiment is such that at least one bent portion of about 180 degrees is formed on the cable 51, and at least one bent portion of about 90 degrees is formed on the cable 51 between the 180-degree bent portion and each of opposite ends of the cable 51. The manner of curving the cable 51 (i.e., the manner of routing the cable 51 shown in the drawings) is a mere example, and the manner of routing of the cable 51 is not limited thereto.

The manner of routing of the cable 51 changes depending on the interior shapes of the operation portion casing 11, the display portion casing 12, the hinge portion 17, etc. and the arrangement of other members disposed there. For example, in the illustrated example, the second connector 52b is disposed in an orientation such that its longitudinal direction becomes parallel to the extending direction of the bottom wall portion of the third support member 33. However, the position of the second connector 52b is established such that the second connector 52b can be mated with a counterpart connector attached to the display portion 14. When the counterpart connector attached to the display portion 14 extends perpendicularly to the extending direction of the bottom wall portion of the third support member 33, the second connector 52b will be disposed such that its longitudinal direction is perpendicular to the extending direction of the bottom wall portion of the third support member 33. Therefore, any number of 180-degree bent portions may be formed on the cable 51, at any location(s). Further, any number of 90-degree bent portions may be formed on the cable 51, at any locations, insofar as at least one 90-degree bent portion is present between the 180-degree bent portion and each of the opposite end portions of the cable 51 connected to the corresponding connectors 52.

In the illustrated example, the cable 51 is disposed to pass through the through-hole 36 of the first pivot coupling portion 35a, the through-hole 36 of the third pivot coupling portion 35c, and the electrical-wire support hole 43 of one shaft-support wall portion of the second support member 32. However, in the present embodiment, no limitation is imposed on the number of the through-holes 36 and the electrical-wire support holes 43 serving as through-holes, insofar as at least one of these holes is present on one rotational axis.

Further, the cable 51 may pass through any of the through holes 36 and the electrical-wire support holes 43. For example, the cable 51 may pass through the through hole 36 of the second pivot coupling portion 35b. Herein, for the sake of convenience, there will be described only the case where the cable 51 has a single V-shaped portion 53 and seven L shaped portions 54 and passes through the through-hole 36 of the first pivot coupling portion 35a, the through-hole 36 of the third pivot coupling portion 35c, and the electrical-wire support hole 43 of one shaft-support wall portion of the second support member 32 as shown in the drawings.

Referring to FIG. 5 and FIGS. 6A to 6C, the hinge support structure 30 is in a second position corresponding to a state in which the display portion casing 12 has been opened in relation to the operation portion casing 11 by a 90 degrees. In the second position, as is best seen from FIG. 6C, the projecting direction of the shaft-support wall portions of the second support member 32 is opposite (i.e., forms an angle of 180 degrees with respect to) the projecting direction of the shaft-support wall portions of the first support member 31. Meanwhile, in the first position shown in FIG. 3 and FIGS. 4A to 4C, the projecting direction of the shaft-support wall portions of the second support member 32 is perpendicular to (i.e., forms an angle of 90 degrees with respect to) the projecting direction of the shaft-support wall portions of the first support member 31.

That is, the position of the hinge support structure 30 can be changed from the first position to the second position through an operation of rotating the second support member 32 90 degrees clockwise in FIG. 4C in relation to the first support member 31 about the first rotation axis. Notably, the third support member 33 and the second support member 32 maintain the same positional relation in both the first position and the second position.

The cable 51 is routed to pass through the through-hole of the first pivot coupling portion 35a and the electrical-wire support hole 43 of one shaft-support wall portion of the second support member 32. A portion of the cable 51 extending from the U-shaped portion 53 to the L shaped portion 54e (including these portions) is accommodated within the intermediate portion 17a of the hinge portion 17 together with the second support member 32. A portion of the cable 51 extending from the L-shaped portion 54c to the first connector 52a

(including the portion 54c) is accommodated within the operation portion casing 11 together with the first support member 31. Therefore, when the hinge support structure 30 is moved from the first position to the second position, the cable 51 is twisted at a portion which passes through the through-hole 36 of the first pivot coupling portion 35a. However, the cable 51 includes the U-shaped portion 53 adjacent to the portion which passes through the through-hole 36 of the first pivot coupling portion 35a, as well as the L-shaped portions 54a to 54d located between the U-shaped portion 53 and the end portion connected to the first connector 52a and the L-shaped portions 54e to 54g located between the U-shaped portion 53 and the end portion connected to the second connector 52b. Therefore, the twist of the cable 51 at the portion passing through the through hole 36 of the first pivot coupling portion 35a is not transferred to the opposite end portions of the cable 51 connected to the first and second connectors 52a and 52b, respectively, so that essentially no or limited amounts of force are applied to the opposite end portions.

Figure 6A:
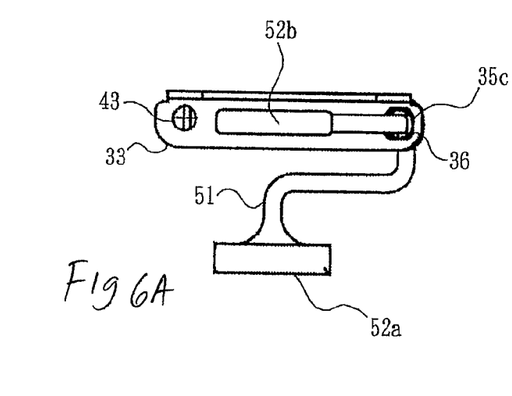
FIGS. 6A to 6C are top, front, and side views of the electrical-wire support apparatus in the second position.
Figure 6B:
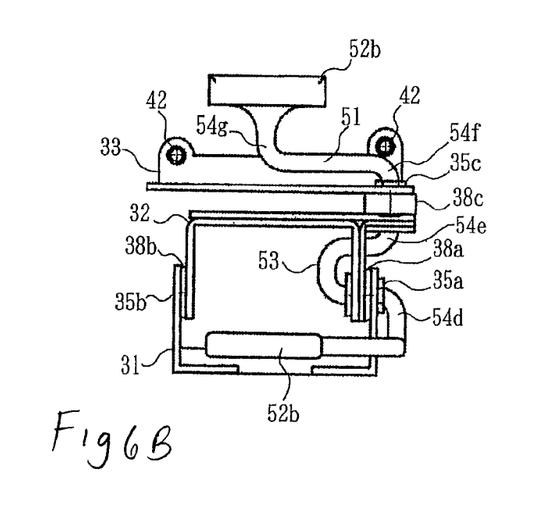
Figure 6C:
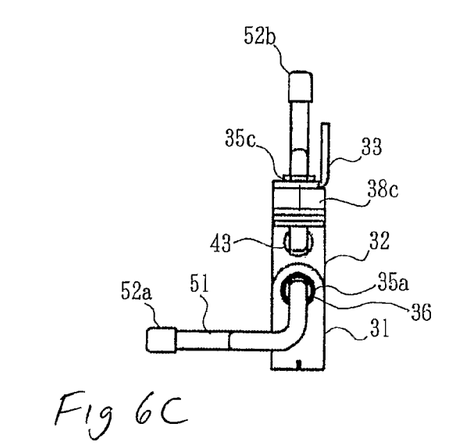

Further, the second support member 32 in the second position can be further rotated by 90 degrees clockwise in FIG. 6C in relation to the first support member 31 about the first rotation axis. As a result of this operation, the hinge support structure 30 assumes a position corresponding to a state in which the display portion casing 12 is opened in relation to the operation portion casing 11 by approximately 180 degrees as shown in FIG. 1. In this case, the cable 51 is further twisted at the portion passing through the through-hole 36 of the first pivot coupling portion 35a.

However, since as described above the twist of the cable 51 at the portion passing through the through-hole 36 of the first pivot coupling portion 35a is not transferred to the opposite end portions of the cable 51 connected to the first and second connectors 52a and 52b, respectively, essentially no or limited amounts of force are applied to the opposite end portions.

Figure 7:
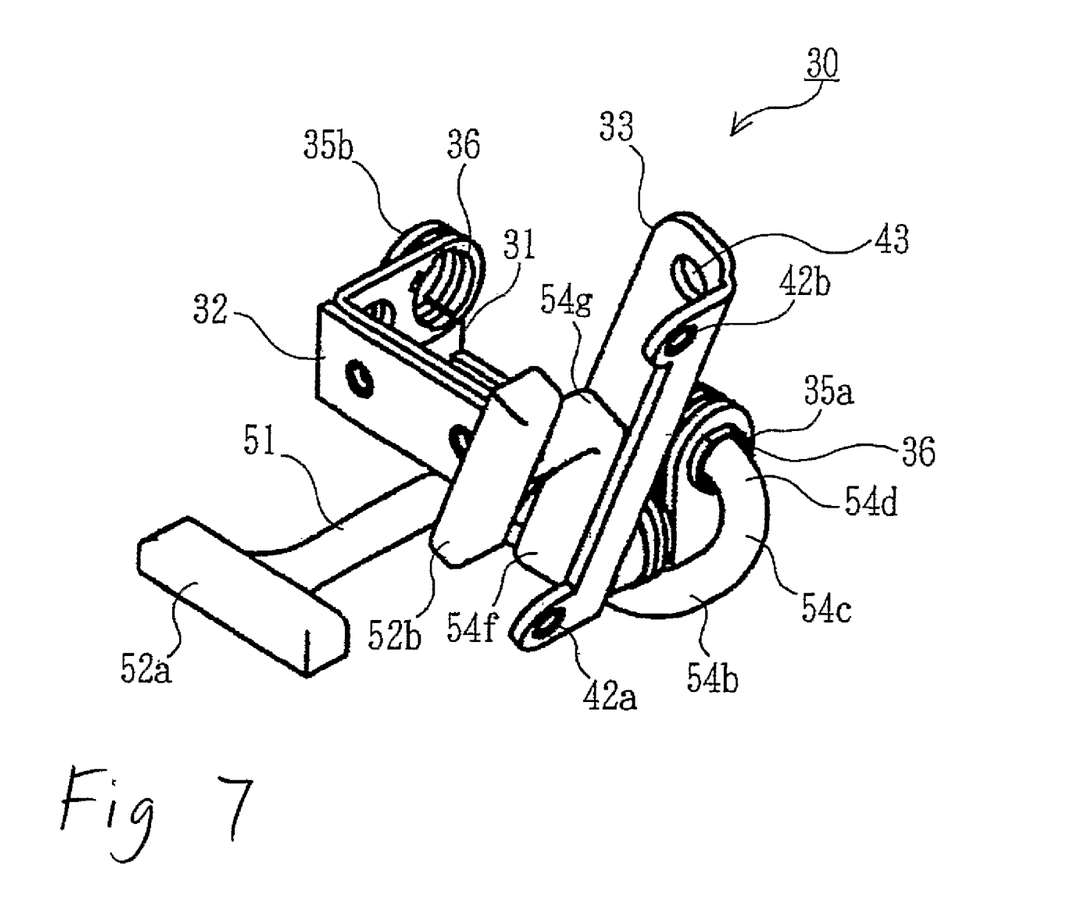
FIG. 7 is a perspective view showing a third position of the electrical-wire support apparatus according to the embodiment of the present invention.
Figure 8A:
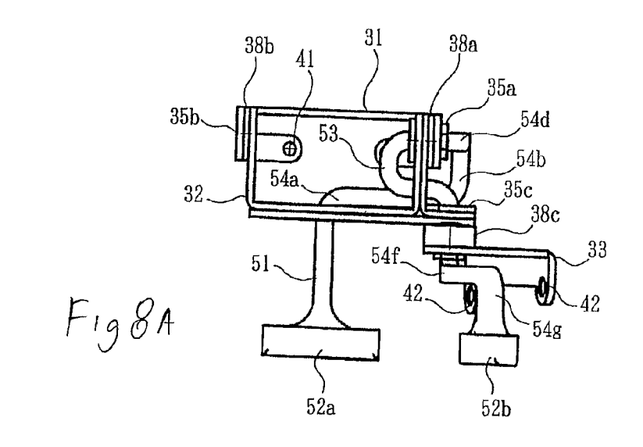
FIGS. 8A to 8C are top, front, and side views of the electrical-wire support apparatus in the third position.
Figure 8B:
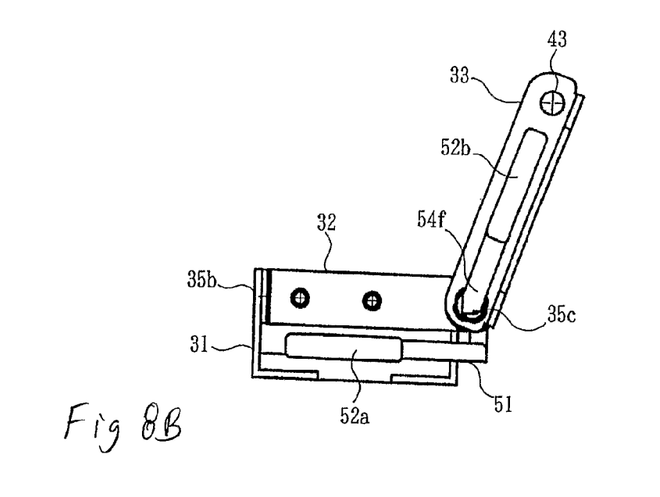
Figure 8C:
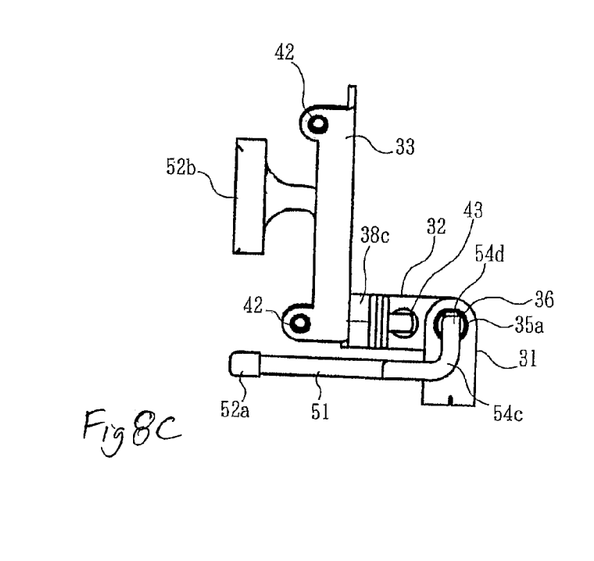

Referring to FIG. 7 and FIGS. BA to BC, the hinge support structure 30 is in a third position corresponding to a state in which the display portion casing 12 has been laterally opened in relation to the operation portion casing 11 by approximately 110 degrees. The third position corresponds to a state in which the display portion casing 12 has been laterally opened in relation to the operation portion casing 11 as shown in FIG. 2. In the third position, as is best seen from FIG. BB, an angle of approximately 110 degrees is formed between the longitudinal direction of the bottom wall portion of the second support member 32 and the longitudinal direction of the bottom wall portion of the third support member 33. In contrast, in the first position shown in FIG. 3 and FIGS. 4A to 4C, the angle formed between the longitudinal direction of the bottom wall portion of the second support member 32 and the longitudinal direction of the bottom wall portion of the third support member 33 is zero degrees.

That is, the position of the hinge support structure 30 can be changed from the first position to the third position through an operation of rotating the third support member 33 about 110 degrees clockwise in FIG. 4B in relation to the second support member 32 about the second rotation axis. Notably, the first support member 31 and the second support member 32 maintain the same positional relation in both the first position and the third position.

The cable 51 is routed to pass through the through-hole 36 of the first pivot coupling portion 35a and the electrical-wire support hole 43 of one shaft-support wall portion of the second support member 32. A portion of the cable 51 extending from the V-shaped portion 53 to the L shaped portion 54e (including these portions) is accommodated within the intermediate portion 17a of the hinge portion 17 together with the second support member 32. A portion of the cable 51 extending from the L-shaped portion 54f to the second connector 52b (including the portion 54f) is accommodated within the display portion casing 12 together with the third support member 33. Therefore, when the hinge Support structure 30 changes its position from the first position to the third position, the cable 51 is twisted at a portion which passes through the through-hole 36 of the second coupling portion 35b. However, the cable 51 pivot includes the U-shaped portion 53 which is adjacent, via the L-shaped portion 54e, to the portion which passes through the through hole 36 of the second pivot coupling portion 35b, as well as the L-shaped portions 54a to 54d located between the u shaped portion 53 and the end portion connected to the first connector 52a and the L-shaped portions 54e to 54g located between the U-shaped portion 53 and the end portion connected to the second connector 52b. Therefore, the twist of the cable 51 at the portion passing through the through hole 36 of the second pivot coupling portion 35b is not transferred to the opposite end portions of the cable 51 connected to the first and second connectors 52a and 52b, respectively, so that essentially no or limited amounts of force are applied to the opposite end portions.

As described above, the hinge support structure 30 of the present embodiment has the through-holes 36 and the electrical-wire support holes 43 serving as through-holes, through which the cable 51 passes, at least one of the through-holes 36 and the electrical-wire support holes 43 is located on a rotation axis, the cable 51 is supported such that at least one U-shaped portion 53 is formed thereon, and at least one L-shaped portion 54 is formed thereon between the U-shaped portion 53 and each of the opposite ends of the cable 51.

Therefore, even when the hinge support structure 30 is rotated about the rotation axis, a twist of the cable 51 at a portion passing through the through-hole 36 on the rotation axis is not transmitted to the opposite end portions of the cable 51, so that essentially no or limited amounts of force act on the opposite end portions.

Accordingly, the cable 51 is not broken, and signals transmitted therethrough do not suffer disturbance.

The hinge support structure 30 includes the first support member 31, which is attached to the operation portion casing 11, the second support member 32, which is attached to the first support member 31 via the first and second pivot coupling portions 35a and 35b to be rotatable about the first rotational axis, and the third support member 33, which is attached to the second support member 32 via the third pivot coupling portion 35c to be rotatable about the second rotational axis. The second support member 32 is attached to the intermediate portion 17a of the hinge portion 17, and the third support member 33 is attached to the display portion casing 12. This configuration enables complex motion of the display portion casing 12 in relation to the operation portion casing II, and improves the visibility of the display portion 14.

The through-holes 36 are formed in the first through third pivot coupling portions 35a, 35b, and 35c, and the cable 51 can be passed through anyone of the through-holes 36. Further, the electrical-wire support holes 43 are formed in the second support member 32 and the third support member 33, and the cable 51 is disposed to pass through the electrical-wire support holes 43. Therefore, the manner of routing the cable 51 can be freely determined, and the cable 51 can be bent without imposing a load on the cable 51.

In the present embodiment, the hinge support structure 30 includes three support members (i.e., the first support member 31, the second support member 32, and the third support member 33). However, the hinge support structure 30 may include four or more support members. In the present embodiment, the hinge support structure 30 has two rotation axes, the first and second rotation axes. However, the hinge support structure 30 may have three or more rotation axes. In the present embodiment, a single U-shaped portion 53 is formed on the cable 51. However, two or more U-shaped portions 53 may be formed on the cable 51.

The present invention is not limited to the above described embodiments. Numerous modifications and variations of the present invention are possible in light of the spirit of the present invention, and they are not excluded from the scope of the present invention.

What is claimed is:

1. An electrical-wire support structure, disposed at a rotary connection portion of a device, which connects first and second portions of the device, the second portion being rotatable about at least two rotational axes, the electrical-wire support structure comprising:
    frame members, each frame member including a through-hole through which an electrical wire may pass, the through-hole being positioned on one of the rotational axes; and
    an electrical wire, the electrical wire including first and second opposite ends, the first end being disposed on the first portion and the second end being disposed on the second portion, the electrical wire being supported by the electrical-wire support structure such that the electrical wire passes through the through-holes, at least one first bent portion of approximately 180 degrees formed on the electrical wire, and at least one second bent portion of approximately 90 degrees formed on the electrical wire between the first bent portion and each of the first and second opposite ends.

2. The electrical-wire support structure according to claim 1, further including a first support member attached to the first portion.

3. The electrical-wire support structure according to claim 2, further including a second support member attached to the first support member via a first coupling portion that is rotatable about a first rotational axis.

4. The electrical-wire support structure according to claim 3, further including a third support member attached to the second support member via a second coupling portion that is rotatable about a second rotational axis.

5. The electrical-wire support structure according to claim 4, wherein the third support member is attached to the second portion.

6. The electrical-wire support structure according to claim 5, wherein the rotational axes are perpendicular to each other.

7. The electrical-wire support structure according to claim 4, wherein the through-holes through which the electrical wire passes are formed in each of the first and second coupling portions.

8. The electrical-wire support structure according to claim 7, wherein the through-holes through which the electrical wire passes are formed in portions of two of the first support member, second support member and the third support member in locations other than the first and second coupling portions.

9. The electrical-wire support structure according to claim 7, further comprising at least one additional through-hole through which the electrical wire passes, the additional through-hole being formed in a portion of one of the first support member, the second support member and the third support member other than the first and second coupling portions.

10. The electrical-wire support structure according to claim 4, wherein the rotational axes are perpendicular to each other.

11. The electrical-wire support structure according to claim 1, wherein the rotational axes are perpendicular to each other.

12. An electrical-wire support structure, disposed at a rotary connection portion, which connects a first portion of a device and a second portion of the device, the second portion being connected to the first portion so as to be rotatable about at least two rotational axes, the electrical-wire support structure supporting an electrical wire having opposite ends disposed on the first portion and the second portion, respectively, and comprising:
    a first support member attached to the first portion;
    a second support member attached to the first support member via a first coupling portion to facilitate rotation about the first rotational axis, and the first coupling portion including a first through-hole; and
    a third support member attached to the second support member via a second coupling portion to facilitate rotation about the second rotational axis, the second coupling portion including a second through-hole;
    wherein the electrical wire passes through the first and second through-holes, the electrical wire including at least one first bent portion of approximately 180 degrees and at least one second bent portion of approximately 90 degrees positioned between the first bent portion and each of the opposite ends.

13. The electrical-wire support structure according to claim 12, further comprising at least one additional through-hole through which the electrical wire passes, each additional through-hole being formed in a portion of one of the first support member, the second support member and the third support member other than the first and second coupling portions.

14. The electrical-wire support structure according to claim 13, wherein the rotational axes are perpendicular to each other.

15. The electrical-wire support structure according to claim 12, wherein the rotational axes are perpendicular to each other.

* * * * *